United States Patent [19]
Flores et al.

[11] Patent Number: 5,144,773
[45] Date of Patent: Sep. 8, 1992

[54] HONING OR GRINDING TOOL AND MEASURING DEVICE FOR MEASURING WEAR

[75] Inventors: Gerhard Flores, Ostfildern; Helmut Reisser; Konrad Lex, both of Geretsried, all of Fed. Rep. of Germany

[73] Assignee: Kadia-Diamant Maschinen-und Werkzeugfabrik O. Kopp GmbH & Co., Nurtingen, Fed. Rep. of Germany

[21] Appl. No.: 460,940
[22] PCT Filed: Jul. 27, 1988
[86] PCT No.: PCT/EP88/00682
    § 371 Date: Mar. 2, 1990
    § 102(e) Date: Mar. 2, 1990
[87] PCT Pub. No.: WO89/00902
    PCT Pub. Date: Feb. 9, 1989

[30] Foreign Application Priority Data

Aug. 3, 1987 [DE] Fed. Rep. of Germany ....... 3725652

[51] Int. Cl.⁵ .............................................. B24B 49/12
[52] U.S. Cl. .................................. 51/165.74; 51/204; 51/207; 73/104; 407/119
[58] Field of Search ................. 51/165.72, 165.74, 325, 51/204, 207, 295, 297, 401, 407; 407/119; 73/104

[56] References Cited

U.S. PATENT DOCUMENTS 4,818,153  4/1989  Strandell et al. ..................... 407/119

FOREIGN PATENT DOCUMENTS 0312072 12/1988 Japan ............................... 51/165.87
0526499  9/1976 U.S.S.R. ............................ 51/165.72

Primary Examiner—Robert A. Rose
Attorney, Agent, or Firm—Jones, Tullar & Cooper

[57] ABSTRACT

A honing or grinding tool and a measuring device used therewith is describe. The honing tool includes a cutting element, a cutting element support and a layer disposed between and connecting the cutting element and the cutting element support. The layer includes a substance embedded therein which selectively absorbs and/or emits electromagnetic radiation at specific wavelengths, such that the substance is exposed when the cutting element is worn off and detected by the measuring device.

11 Claims, 3 Drawing Sheets

HONING OR GRINDING TOOL AND MEASURING DEVICE FOR MEASURING WEAR

BACKGROUND OF THE INVENTION

The invention relates to a honing or grinding tool, comprising a cutting element, a cutting element support for the cutting element, and a measuring device for measuring wear of such tools.

Such tools are known. They are tools for machining by chip removal wherein a cutting layer (cutting element) is disposed on a steel base (cutting element support) by means of an adhesive layer.

In connection with the installation of fully automatic machining operations, primarily with multi-spindle machines, monitoring for wear is of great importance for operational safety and manufacturing quality. Wear of a honing bar is to the greatest extend dependent on the number of pieces machined (tool life quantity). Other effects are, for example, feed, material hardness or non-homogeneity of the tool. Tool replacement at the right time is very important for efficient manufacturing. It should not be performed too early, i.e. when the volume of the cutting means (volume of the cutting element or cutting layer) has not yet been fully used up; nor should it be performed too late, because this would mean a run with tools no longer of qualitatively high value, i.e. rejects.

Up to now it was possible to monitor the wear of the cutting element of a honing bar or a grinding wheel, for example approximately, in that in the simplest case the shortest tool life (time for machining one work piece) or tool life quantity (number of the work pieces machined) was determined and this value was made the standard for checking of the machine tool by the operators at corresponding intervals. Checking itself was performed by visual inspection of the tool.

Another possibility, in case of electronic-mechanical or electronic-hydraulic feed of the tools, lies in monitoring the feed travel. However, this means only indirect checking of wear of the cutting layer of a honing bar. If feeding is performed in steps by means of a defined number of pulses, it is possible, corresponding to the assumed wear, to also provide after a predetermined number of work cycles fixed predetermined number of additional feed pulses. Such a device also does not constitute actual wear monitoring, but merely compensation for wear. Only the sum of the additional pulses required for compensation and the comparison with an empirically set useable thickness of the cutting layer of a honing bar, however, will result in information as to whether replacement of a honing bar is needed, which can be processed by an automatic control.

In modern automatic controls the usable thickness of the cutting layer, the number of steps per compensating operation and the approach angle of a honing tool are input in the control. The machine is stopped when it reaches the wear limit, based on the addition of the compensation distance. The wear condition of the honing bars is displayed on a monitor by means of bar graphs. When reaching a programmable warning limit the automatic control alerts the operator in good time to replace the tool. However, this tool wear monitoring can only be employed in case of feeding by means of a step motor. This indirect wear monitoring cannot be used with hydraulic feeding. Furthermore, this indirect monitoring has the disadvantage of having to take into account manufacturing tolerances in regard to height. But such a height may under certain circumstances correspond to a tool life quantity of up to several thousand work pieces. Thus indirect wear monitoring does not guarantee the best possible efficient use of the cutting layer.

No honing bars are known in which the wear condition can be directly determined. Tools for machining of workpieces by chip removal are known from related fields, where wear monitoring is performed. However, the technologies used there cannot be directly used for the manufacture of a honing bar in connection with which direct wear monitoring can be performed.

For example, in EP-A-0 225 300 a throw-away carbide indexable insert is described, where a layer impervious to radiation is disposed on a substrate emitting radiation. With increased wear the substrate emitting radiation is increasingly exposed in the area of the flank. The radiation emitted by the substrate is determined as a measurement of wear. It is furthermore known from this reference to detect wear over small areas of the crater-wear type on the cutting edge itself. The direct wear monitoring by way of flank wear is impossible to apply in connection with honing bars, because they are in contact with the workpiece over large areas and have no flanks on which wear could be detected in this manner.

The same is true for DD-A-222 414. A method for detecting wear of a lathe chisel is described, in which a dot-shaped radioactive marker is applied to the flank and/or cutting edge of the tool. The radioactive marker wears off along with general wear. The change in radiation caused by this is used to measure wear. Aside from the not inconsiderable radiation exposure of the work place, such wear measuring is not usable with honing bars, because two-dimensional monitoring of the cutting element is not possible.

It is known from the German Journal "Fertigungstechnik und Betrieb" [Manufacturing Techniques and Operation] (1985) 9, pp. 523–526, in particular page 524, to coat the flank of a throw-way carbide indexable insert with a radioactive marking. Again, Wear detection takes place by measuring the flank wear. This method, too, besides the radiation exposure, is not usable for honing bars because these have no flanks. The same holds true for the measuring principle, alternatively cited in this publication, for the application of guideway structures at the flanks, which give off a signal when bonding because wear occurs. Honing and grinding tools are both tools with undeterminate cutting geometry in which flanks generally do not exit, contrary to throw-away carbide indexable inserts, drill or lathe chisels.

A drill is known from U.S. Pat. No. 4,420,253, into the shaft of which a glass fiber has been inserted. One end of the glass fiber is illuminated by a light source. The other end extends into the shaft and terminates at a set distance from the cutting edge. After the material located between the fiber end and the cutting edge has worn off, the light is registered in a detector located underneath the drill. Wear monitoring of a homing bar is not possible with such a method, because the entire area of the cutting element could only be monitored at excessive cost.

From German Published, Non-examined Patent Application DE-OS 34 04 257 a measuring device is known for measuring the wear on a knife for cutting semiconductor plates. In this publication the light beam, originating in an emitting device and reflected by the knife, is registered in a detector. Wear of the knife element results in a change of the reflective behavior of the knife. For this reason the intensity of the reflected light beam also changes. This measuring device has the disadvantage of being very susceptible to scattered light of other radiation sources. As recited in this reference, the measuring device does not function if the knife is wetted by a rinsing and/or cooling media. Furthermore, the measuring device only supplies a signal, because of the rotation of the knife, corresponding to a mean wear detected over a partial area of the knife.

Even if the mentioned disadvantages were accepted, such a method would in principle not be usable for honing and grinding tools, because wear of these tools cannot be definitely assigned to the reflective behavior of the cutting element at the time, otherwise determinable with relative accuracy, when they need to be replaced.

In U.S. Pat. No. 4,031,368 a measuring device on a machine tool is described wherein a laser beam is guided across the tool. The reflection of the laser beam is registered in a receiver arrangement and passed on to an evaluation device. This evaluation device computers wear from optical measurement data, combined with other parameters (for example, size of the workpiece, vibrations, roughness of the surface, and the like). This measuring device requires expensive and maintenance-intensive devices, such as a laser resonator. For the reasons already mentioned above, it is not useful for detecting wear on honing bars.

SUMMARY OF THE INVENTION

It is an object of the invention to improve a honing or grinding tool of the type mentioned above so that it becomes possible to detect the wear condition of the cutting element directly, i.e. to determine when the cutting element is used up, so that replacement of the honing bar is required. The cutting layer of a honing bar or grinding wheel, formed by adhesive material containing diamond grains, is understood to be the "cutting element". Furthermore, the honing bar should be designed in such a way, that monitoring of irregularities of the cutting layer is independent, i.e. it should be possible, in spite of such irregularities in the height of the cutting layer, to exactly determine the correct time for changing tools. Wear measurement at the honing bar by means of the measuring device described should also function if the honing bar is wetted by a rinsing or cooling media (for example honing oil). Furthermore, a suitable measuring device for measuring wear on such a honing or grinding tool is to be provided, by means of which the wear condition can be detected simply and directly, i.e. it can be determined when the cutting element is worn out and replacement becomes necessary.

This object is attained by means of the invention by a honing or grinding tool of the type previously described, in which between the cutting element and the cutting element support a substance is disposed, which selectively absorbs and/or emits electromagnetic radiation at specific wave lengths and is embedded in the form of a layer in another layer of a different material or is disposed as a layer on an indicator support placed as a discrete element below the cutting element.

A measuring device for measuring wear on a honing or grinding tool of the type mentioned is characterized in that an emitter arrangement emitting a selective light radiation, is disposed focused on the cutting element, and in that furthermore a receiver arrangement, receiving selected radiation, is disposed focused on the honing tool in such a way, that it receives the radiation directed on the tool by the emitting arrangement and reflected by the tool, and in that it derives a display signal therefrom.

As soon as the "cutting element", i.e. The cutting layer of a honing bar has worn off, the selectively absorbing and/or emitting substance disposed underneath it is exposed. This can be detected without complicated evaluation of the radiation and in this way assigned to the extent of wear, which necessitates a changing of the tool, and a signal can be derived from this, which either informs the operator or causes an automatic exchange of the tool. The measuring device furthermore has the advantage that measurement is not sensitive to scattered light from other radiation sources, unwanted reflections, including those from the surface of the cutting element, etc. Screening devices are therefore unnecessary. Measurements can be taken directly at the tool under normal working conditions. The measuring operation also functions if the honing bar or grinding wheel are wetted by a rinsing and/or cooling media.

Exemplary embodiments of the invention and its advantageous improvements will be described below by means of the attached drawings.

DESCRIPTION OF THE PREFERRED EMBODIMENTS

Figure 1:
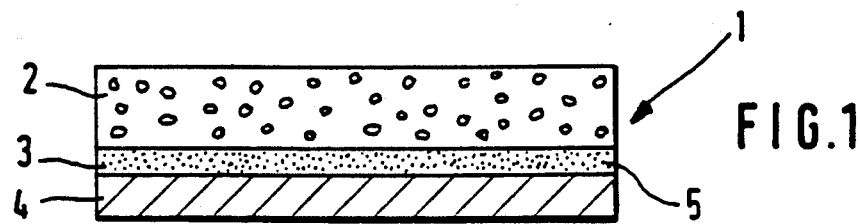
FIG. 1 illustrates a cross section of an exemplary embodiment of a tool.

A honing bar 1 (FIG. 1) is formed by a cutting layer 2, an adhesive layer 3 and a steel base 4. Customarily the steel base is approximately 1 to 3 mm thick, the adhesive layer customarily 0.1 to 0.2 mm. It is composed of binder material as well as several nonferrous metals (for example copper, zinc, tin). The cutting layer consists of binder material with diamond grain, having a diameter of 7 to 400 $\mu$m and at a concentration of 1 to 200 carat/cm$^3$, embedded in it. Such honing bars are sintered at temperatures of 700° to 1,000°.

In the exemplary embodiment in accordance with FIG. 1, a fluorescing dye, shown in the form of powder particles 5, is embedded in the adhesive layer 3 at a ratio of two parts binder power to one part dye. Fluorescing dyes which can withstand high temperatures and are non-toxic are known from the cosmetics and printing trade. They are obtained by means of so-called fluorophores.

Figure 2:
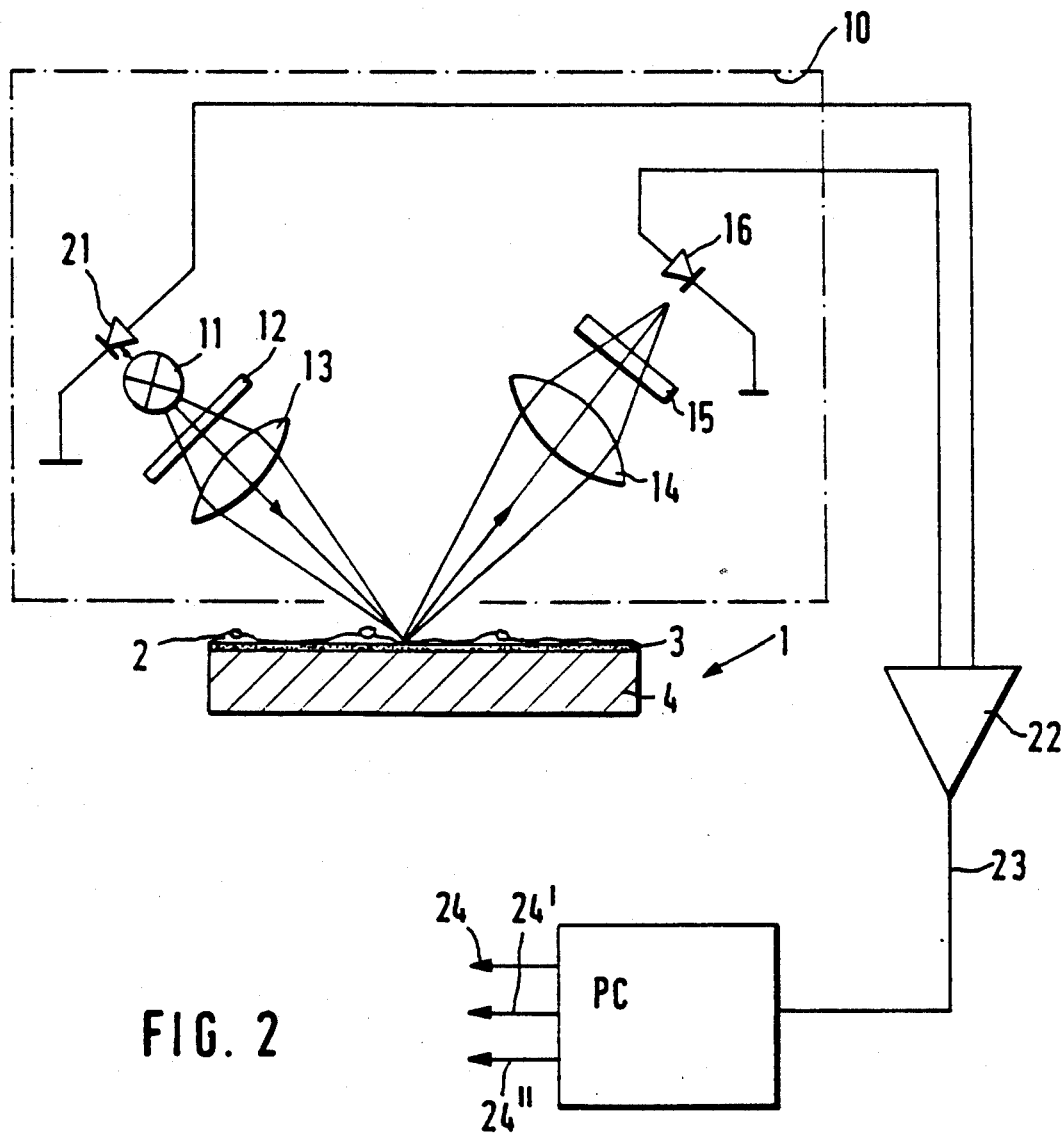
FIG. 2 illustrates an exemplary embodiment of a measuring device.

FIG. 2 shows a measuring device for measuring the wear of a honing bar 1. If the cutting layer 2 has worn off to the point that the adhesive layer 4 containing fluorescing dye is exposed, the following can be noted:

A measuring device 10 has been provided for this purpose on the respective machine tool (honing machine, grinding machine). It has an emitter device giving off selective radiation, formed by a radiation source 11, filter 12 and a lens arrangement 13 for focusing the emitted radiation. The focused radiation impinges on the honing bar 1, i.e. after the cutting layer 2 has worn off, on the adhesive layer 3 containing the fluroescing substance 5. Furthermore, a receiving device has been provided, comprising a lens arrangement 14, filters 15 and corresponding photodiodes 16. The photodiodes 16 are a detector, i.e. a component the electrical signal of which is determined by the impinging radiation. The emitter device and the receiving device are such that the radiation emitted by the substance 5 when it is excited by the emitter device is received by the receiving device. Only one filter 12 or 15 each has been shown in the drawings. This was done for the sake of clarity of the drawing itself. To detect the individual wave lengths of the specific spectra, it is possible to provide several coordinated filters 12 or 15 with associated lenses.

The filter 12 is designed such that a specific distribution of wavelengths (spectrum) from the radiation source 11 remains, which reaches the surface of the tool 1. This radiation is called excitation radiation, for example with wavelengths from 254 to 366 nm. When impinging on the fluorescing substance embedded in the form of powder particles 5 in the adhesive layer 3, it causes an emission radiation having a different wavelength distribution (spectrum), for example with wavelengths of 490, 530, 610 nm.

The excitation radiation of a certain spectrum may be generated either by the radiation source 11 itself already emitting a correspondingly selective spectrum (for example a mercury low pressure radiator). Another possibility, such as shown in FIG. 2, consists in interposing between the radiation source and the surface to be excited by the excitation radiation corresponding filters 12, the transparency of which is correspondingly selectively adjusted. Thus the filters 15 are adjusted in such a way that they only let through radiation of the corresponding emission spectrum. In this way it is absolutely assured that only the radiation caused by the fluorescence of the fluorescing dye in the adhesive layer 3 reaches the photodiode 16 and causes a corresponding electrical signal there. Such a device is impervious to any other radiation (scattered light from other radiation sources, unwanted reflections, etc).

A further receiver in the form of a photodiode 21 is provided parallel to the emitter/receiver arrangement, which directly receives the radiation emitted by the radiation source 11. The signals from both photodiode arrangements 16 and 21 reach a quotient generator 22. It supplies the ratio of both signals. In this way it is assured that variations in the illumination intensity (caused, for example, by variations in the power supply) are not included in the final signal emitted by the quotient generator 22 on the line 23. The signal at the output of the quotient generator 22 reaches a personal computer PC for evaluation and/or registration. Signals, for example "early warning", "earliest time for replacement", "latest time for replacement", are sent via further liens 24, 24' 24''.

Figure 3:
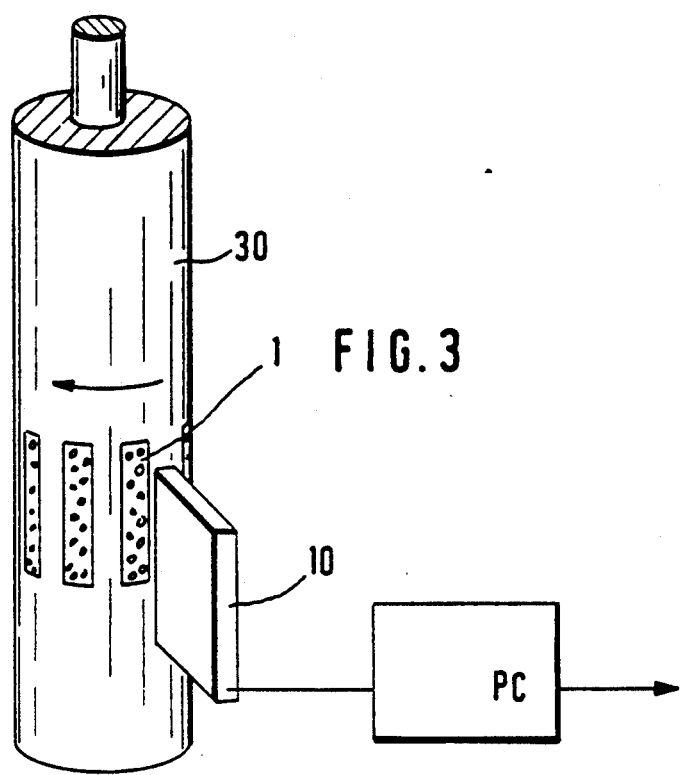
FIG. 3 illustrates the disposition of a measuring device in accordance with FIG. 2 on a honing tool.

FIG. 3 shows the arrangement of the measuring device 10 in the vicinity of a honing tool 30, along the circumference of which a plurality of honing bars 1 have been disposed.

Figure 4:
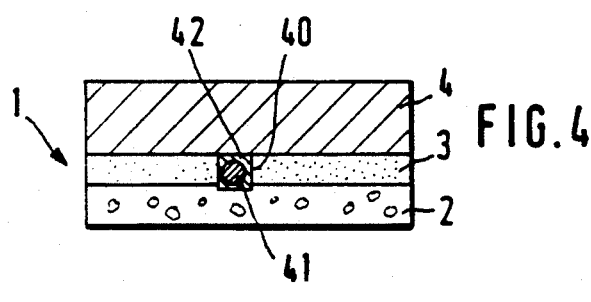
FIG. 4 illustrates a cross section of a second exemplary embodiment of a tool.
Figure 5:
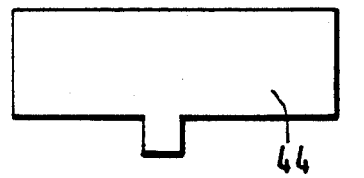
FIG. 5 illustrates a cross section of a die for manufacturing a tool in accordance with FIG. 4.
Figure 6:
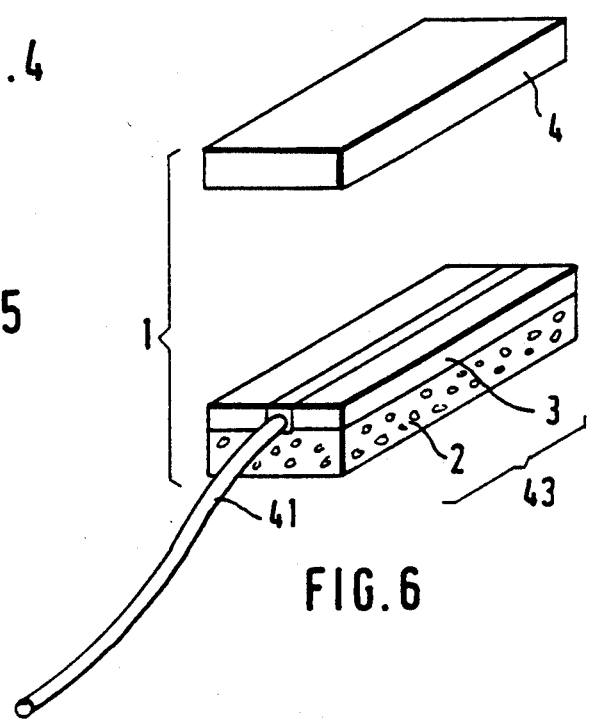
FIG. 6 illustrates a step in the manufacture of a further exemplary embodiment of a tool in accordance with the invention.

In FIG. 1 the fluorescing dye is mixed into the adhesive layer 3 in the form of powder particles 5, which is exposed as soon as the cutting layer 2 has worn off. FIG. 4 shows another embodiment of the honing bar. There the adhesive layer 3 is provided with a groove 40 prior to the attachment of the steel base 4. This is cut sufficiently deep so that it just extends into the surface of the cutting layer 2 or adjoins it in such a way that the groove is open towards the outside after the cutting layer 2 has worn off. The groove itself has a cross section of, for example, 0.3×0.3 mm. A copper wire 41 is inserted into this groove as in indicator carrier; as indicator it has a layer 42 of fluorescing dye. The layer may be approximately 0.1 mm thick. First (see FIG. 6), a structural part 43, comprising adhesive layer 3 and cutting layer 2, is made, into which a groove 40 is punched with the aid of a die 44, shown in cross section in FIG. 5. The copper wire 41 is then placed into this groove. Then the steel base 4 is pressed on and the entire honing bar 1 is sintered. The advantage of this device, compared with FIG. 1, is that there is no weakening of the cross section of the adhesive layer.

Figure 7:
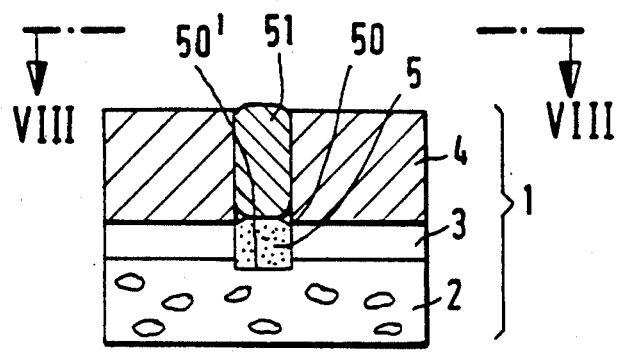
FIG. 7 illustrates a cross section of a further exemplary embodiment of a tool.
Figure 8:
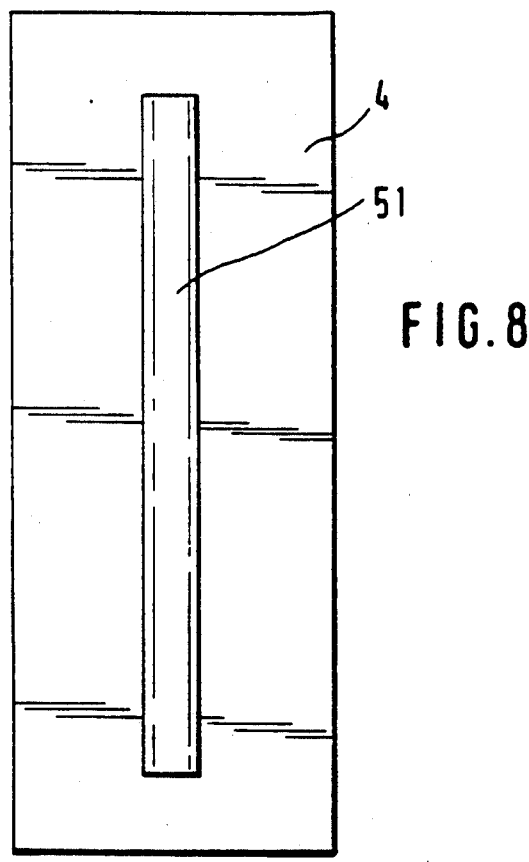
FIG. 8 illustrates a top view of the tool in accordance with FIG. 7.

In accordance with FIGS. 7 and 8, after the entire honing bar 1 is finished, a groove 50 is cut into the tool (for example by spark erosion) from the side of the steel base 4 in such a way that the foot of the groove just extends into the cutting layer 2 or borders against it and exposes the groove 50 from this end when the cutting layer 2 is worn off. A fluorescing dye 5 is then inserted into this groove. The groove then is covered with solder 51. In this connection it is advantageous that the dye need not be exposed to the temperature and pressure of a sintering process because it is only inserted afterwards. In place of a groove it is also possible to provide a bore. In general, it should just be a recess extending up to the cutting layer.

It is important that after the cutting element has worn off, a substance is exposed the appearance of which can be selectively detected. This can be done not only through measuring selective emitted radiation, but also by measuring selective absorption. In general the measuring device 10 is a photometric device, with the inclusion of the selectively absorbing and/or emitting substance, in the tool in the form of an emitter/receiver arrangement. Alternately to the fluorometric method shown, detection of the absorption of infrared radiation or UV radiation is possible. With all radiation it is particularly advantageous if it is not visible light in order to eliminate the effects of scattered or secondary light.

In all these way sit is possible to obtain a faultlessly operating measuring device suitable for the auto-identification of worn tools (honing bars, grinding wheels).

What is claimed is:

1. A cylindrical honing or grinding tool, comprising:
   at least one cutting element having an extent in the circumferential direction of the tool;
   a steel base cutting element support for each cutting element; and
   an adhesive layer disposed between and connecting each cutting element and its respective cutting element support, each said adhesive layer having a fluorescing substance embedded therein which selectively absorbs and/or emits electromagnetic radiation at specific wavelengths, such that the fluorescing substance is exposed when the cutting element is worn off, said fluorescing substance after being excited by a first set wavelength distribution emitting radiation of a second set wavelength distribution.

2. The honing or grinding tool as defined in claim 1, wherein said fluorescing substance absorbs UV radiation.

3. The honing or grinding tool as defined in claim 1, wherein said fluorescing substance absorbs infrared radiation.

4. A honing or grinding tool, comprising:
a cutting element;
a cutting element support; and
a layer disposed between and connecting the cutting element and the cutting element support, said layer having a recess formed therein within which an indicator carrier surrounded by a further layer is embedded, said further layer having fluorescing substance therein, such that the substance is exposed when the cutting element is worn off.

5. The honing or grinding tool as defined in claim 4, wherein the indicator carrier comprises a wire.

6. The honing or grinding tool as defined in claim 5, wherein the wire is of non-ferrous metal.

7. The honing or grinding tool as defined in claim 4, wherein the recess comprises a groove which extends into said cutting element, said cutting element support and said layer.

8. The honing or grinding tool as defined in claim 4, wherein the cutting element comprises a cutting layer, the cutting element support comprises a steel base, and the layer disposed between the cutting element and the cutting element support comprises an adhesive layer.

9. The honing or grinding tool as defined in claim 4, wherein said substance, after being excited by a first set wavelength distribution, emits radiation of a second set wavelength distribution.

10. The honing or grinding tool as defined in claim 4, wherein said fluorescing substance comprises a substance which absorbs UV radiation.

11. The honing or grinding tool as defined in claim 4, wherein said fluorescing substance comprises a substance which absorbs infrared radiation.

* * * * *